United States Patent Office 3,311,572
Patented Mar. 28, 1967

3,311,572
WEAKLY BASIC ANION EXCHANGE RESINS PREPARED FROM ACRYLONITRILE - POLYETHYLENICALLY UNSATURATED COMPOUNDS REACTED WITH DIAMINES AND PROCESS FOR MAKING SAME
Bayard T. Storey, Flourtown, Leon M. Miller, Chalfont, and William Fries, Philadelphia, Pa., assignors to Rohm & Haas Company, Philadelphia, Pa., a corporation of Delaware
No Drawing. Filed Dec. 28, 1964, Ser. No. 421,724
11 Claims. (Cl. 260—2.1)

This application is a continuation-in-part of our application Ser. No. 216,958, which was filed on Aug. 15, 1962, and which has since been abandoned.

This invention concerns anion exchange resins of the weakly basic type. It also concerns processes for preparing such resins which comprise reacting a diamino compound with an insoluble, cross-linked copolymer possessing cyano groups attached to the polymer structure in such a way as to produce rings of the general cyclic structure

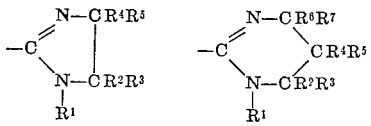

in which $R^1$, $R^2$, $R^3$, $R^4$, $R^5$ $R^6$ and $R^7$ are selected from the group consisting of hydrogen, lower alkyl or substituted alkyl.

The products of this invention are stable to osmotic shock and resistant to attrition. They have high capacity, high basicity, and are able to go through a large number of cycles between the acid form and the base form without appreciable change and with negligible physical breakdown of the resin particles.

The insoluble cross-linked copolymers which are reacted with the diamino compounds to give the ion exchange resins of this invention are those which contain a major proportion of an unsaturated compound which can undergo polymerization and which contains the cyano group: —C≡N, as a substituent. The cross-linked copolymers are made by copolymerizing an unsaturated nitrile with a polyethylenically unsaturated compound such as divinylbenzene, which gives rise to a three-dimensional macro-reticular network insoluble in water and other solvents.

Suitable cyano-containing compounds include acrylonitrile, methacrylonitrile, and vinylidene cyanide; 1-cyanomethyl, 1-cyanoethyl, 1-cyanopropyl, 2-cyanopropyl, 1-cyanobutyl, 2-cyanobutyl, 3-cyanobutyl acrylates and methacrylates; the corresponding N-cyanoalkyl acrylamides and methacrylamides; α-, ortho-, meta-, and para-cyano styrene; 1-cyanobutadiene and 2-cyanobutadiene; the methyl, ethyl, propyl, and butyl esters of α-cyanoacrylic acid; and the N-cyanoalkyl esters and amides of a α-cyanoacrylic acid.

Suitable cross-linking agents for the desired polymerizable monomers containing a cyano group are polyvinyl compounds used singly or in mixtures, such as meta-divinylbenzene, para-divinylbenzene, mixtures of these isomers, 1,3,5 - trivinylbenzene, 1,2,4 - trivinylbenzene, trivinoxypropane, the isomeric divinyl xylenes, divinyl toluenes, and divinylnaphthalenes, N,N'-methylene bisacrylamide, N,N'-methylene bismethacrylamide, and N,N'-divinyl ethylene urea. The amount of cross-linking agent can be varied over wide limits, but too large an amount of cross-linker leads to an anion exchange resin with a reduced number of functional groups and, hence, to a low weight capacity, whereas too small an amount of cross-linker leads to excessive moisture content of the ion exchange resin and, hence, to a low volume capacity. The useful range of cross-linker content is 0.5% to 30% by weight of the polymerizable monomer, with 2% to 20% being the preferred range.

Although the addition of monomers which do not contain cyano groups results in decreasing the capacity of the final anion exchange resin, it is sometimes desirable to do so for several reasons. It may be necessary to improve the physical characteristics of the resin, and frequently the addition of the monomer, such as methyl methacrylate, will give the desired effect.

It has been noted that the addition of vinyl pyridine will increase the moisture content of the resin. Other monomers which can be copolymerized with the cyano-containing monomers include the alkyl acrylates and methacrylates, styrene, vinyl toluene, etc.

The mixture of the cyano-containing monomer and cross-linker may be copolymerized to a cross-linked macromolecular structure by means of free radical chain initiators activated by the influence of heat. Such initiators are well known and are exemplified by the following compounds: benzoyl peroxide, lauroyl peroxide, acetyl peroxide, tert-butyl hydroperoxide, di-tert-butyl peroxide, tert-butyl perbenzoate, tert-butyl peracetate, cumene hydroperoxide, azo - bis - isobutyronitrile, azo - bis - cyclohexancarbo nitrile, and di-tert-butyl peroxalate. Such initiators may be used in amounts ranging from .01% to 5% of the weight of polymerizable monomers, but preferably in amounts ranging from .02% to 1.5%.

The cross-linked copolymers may be obtained in the particulate form desired for ion exchange precursors by carrying out the copolymerization in bulk, and then grinding the polymer mass to granules of the desired size. It is, however, more convenient to carry out the copolymerization by suspending the monomer mixture containing initiator as droplets in a well-stirred aqueous medium. In this manner, spheroidal particles of the desired size are obtained directly, and more precise control of the polymerization temperature is made feasible. Liquids miscible with the monomers may also be added to the reaction mixture. Any such liquid diluent will serve to moderate those temperature increases which may be encountered with particularly reactive monomers. If the liquid diluent is also a good swelling agent for the cross-linked copolymer formed by the polymerization of the monomers, the efficiency of interchain cross-linking is reduced and the resulting copolymer, when converted to the desired ion exchanger, will exhibit the properties of increased swelling and increased gel porosity characteristic of a copolymer made without swelling solvent but containing a smaller amount of cross-linker. If, on the other hand, the liquid diluent does not swell or is not imbibed by the cross-linked copolymer formed by the polymerization of the monomers, but is in fact a precipitant for said copolymer, the resulting copolymer will have the macroporosity and high surface area characteristic of a macroreticular structure. These structures are preferred for ion exchange resins which are to be used in non-polar media, since the macroporosity endowed by the macroreticular structure allows rapid diffusion of materials into and out of the resin particle in these media as well as in dilute aqueous media. If the copolymer is to be made in the form of a bulk casting, any monomer mixture and miscible liquid diluent may be used; if the copolymer is to be made by suspension polymerization in aqueous medium, the monomer mixture and liquid diluent should be immiscible with water, or be made immiscible by salting out of aqueous solution.

In order to obtain the anion exchange resins of this invention, the copolymers containing cyano groups must be reacted with diamino compounds of the general structures:

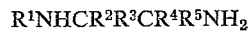

wherein $R^1$, $R^2$, $R^3$, $R^4$, $R^5$, $R^6$, and $R^7$ are hydrogen, lower alkyl or substituted alkyl. Thus, the diamines possess at least one primary amino group and one secondary amino group or two primary amino groups separated by two or three carbon atoms. As indicated below, the amino compounds react with the nitrile group of the copolymer to give the following general cyclic structures:

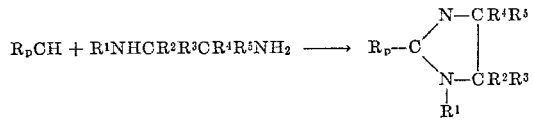

and

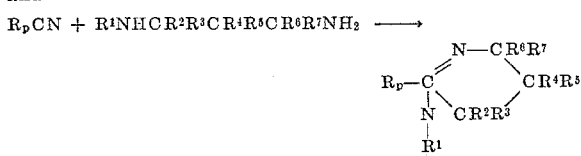

in which $R_p$ is the polymer chain and $R^1$, $R^2$, $R^3$, $R^4$, $R^5$, $R^6$, and $R^7$ are as described hereinbefore.

The resulting five-membered heterocycle is known as the imidazoline ring; the resulting six-membered heterocycle is known as the tetrahydropyrimidine ring.

Satisfactory amino compounds include the following diamines: ethylene diamine, propylene diamine, trimethylene diamine, aminoethylethanolamine, N-hydroxyethyl propylene diamine, neopentyl diamine, N-alkyl ethylene diamines, N-alkyl propylene diamines, and N-alkyl trimethylene diamines.

Critical to the successful operation of the invention is the use of diamines, as illustrated above. It is essential that the amino compounds employed have a structure in which the N is separated by 2 or 3 carbon atoms, otherwise the invention will not work as herein described. Thus, for example, if diethylenetriamine and its homologues are used a cyclic structure such as features the novel compounds herein disclosed cannot be obtained. This is because the polyamino nature of the reactant will cause side reactions to occur which will predominate over the formation of the sought-for products.

A minimum of one mole of amine per mole of cyano group in the polymer is required, but it is preferred to use at least a slight excess of amine even when conducting the reaction in a solvent. It is also possible to conduct the reaction without using an additional solvent but using an excess of amine which functions as a solvating agent. Under these conditions, as much as 10 moles of amine per mole of cyano group in the polymer may be employed.

The reaction between the diamines and cross-linked copolymer may be carried out by two different methods. In the first method, the copolymer is simply heated in an excess of the amine until the evolution of ammonia has ceased. For the reaction to occur, the temperature of reaction mixture must be at least 105° C.; a temperature range of 130° C. to 200° C. is usually preferred. Alkali metal alkoxides such as sodium methoxide, and sulfur compounds such as $H_2S$, sodium methyl mercaptide, and thioacetamide can be used to advantage as catalysts for the reaction. Reaction times may vary from 8 hours to 48 hours, the shorter times being achieved at higher temperatures and in the presence of catalysts. After the reaction mixture has cooled, the excess amine is drained off, and the beads are washed with methanol and water. The particles are then backwashed to remove the last traces of amine and to remove any solid suspended matter and fines. Using this method, the anion exchange resin is produced in the free base form.

In the second method, the cyano groups of the copolymer are first converted to imidate ester salt groups by reaction under anhydrous conditions with strong mineral acid and an alcohol.

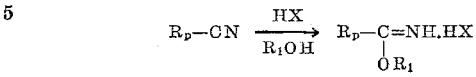

in which X is $Cl^-$, $HSO_4^-$, $NO_3^-$, or $ClO_4^-$. The reactive imidate ester salt is then treated with the diamino compound to give the desired heterocycle as the salt of the acid used. The anion exchange resins made by this method are obtained in salt form rather than in the free base form, but are readily converted to the free base form by treatment with alkaline solution. Typical of the alcohols which may be used to form the imidate ester salt are methyl, ethyl, isopropyl, n-propyl, isobutyl, and n-butyl. Since the alcohol moiety is not present in the finished product, it is advantageous to use the lowest cost alcohol available. Typical of the strong mineral acids which may be used are HCl, $H_2SO_4$, $HNO_3$ and $HClO_4$. Since the reaction must be run under anhydrous conditions, HCl and $H_2SO_4$ are preferred since they are more readily available in anhydrous form. Substances which generate HCl in the presence of alcohols, such as $SO_2Cl_2$, $ClSO_3H$, and chloromethyl ether may also be used advantageously. The reaction is normally run at —10° C. to 40° C. for one to sixteen hours. Convenient conditions are 0° C. to 25° C. for three to six hours. The imidate ester salt form of the resin is then treated with a slight molar excess of the desired amine for five to fifteen hours at temperatures ranging from 60° C. to 105° C. The resin is then washed free of alcohol and amine, and is either used directly in the salt form as obtained, or converted to the free base form by regeneration with an aqueous ammonia or alkali solution.

The following examples, in which all parts are by weight, serve further to illustrate the process of this invention and the products thereof. These examples should not be construed as restrictions upon the scope of this invention.

*Example I*

Into a three-liter four-necked flask equipped with a thermometer, stirrer, thermoregulator mechanism, and reflux condenser was charged a solution of 20 parts salt, 0.03 part gelatin, and 2.5 parts of a commercial dispersing agent in 665 parts water. To this solution was added a mixture of 318 parts acrylonitrile, 182 parts of commercial divinylbenzene assaying 55%, and 5 parts lauroyl peroxide. The stirred mixture, containing droplets of the polymerizable material suspended as droplets in the aqueous medium was heated to 65° C. The batch was held at 65° C. for four hours, during which time an exotherm was observed, which was controlled by external cooling with an ice bath. The polymerization was finished by heating for one hour at 90° C. The batch was then cooled, and the off-white, hazy beads were filtered, washed thoroughly with water, and dried for 16 hours at 85° C.

Fifty parts of the copolymer prepared as described hereinbefore were mixed with 200 parts of ethylene diamine. The mixture was heated at the reflux temperature of 109° C. for 60 hours, at which point evolution of $NH_3$ had ceased. After the batch had cooled, excess amine was removed from the beads by washing with water. The resulting anion exchange resin had a capacity of 1.5 milliequivalents per gram of dry resin in the chloride form. Addition of 10 parts of thioacetamide to the same mixture and refluxing for 9 hours gave a resin, after washing, with a capacity of 3.4 meq./gm. dry resin in the chloride form.

*Example II*

Fifty parts of the copolymer prepared according to the process described in Example I were slurried into 68 parts of anhydrous methyl alcohol, contained in a 500 ml. flask equipped with stirrer, thermometer, gas delivery tube, and drying tube. The mixture was cooled to 5° C., and 45 parts of dry HCl gas were passed into the mixture over the course of one hour, after which the slurry was then stirred for five hours at 5° C. The beads were drained, washed with one portion of dry methyl alcohol, and a mixture of 30 parts dry methyl alcohol, and a mixture of 120 parts ethylene diamine was added. The mixture was refluxed for 7 hours to complete the reaction. The beads were washed with methyl alcohol and water, and then backwashed to remove fines and residual amine. The finished resin had an anion exchange capacity of 5.0 meq./gm. dry resin in the chloride form.

*Example III*

50 parts of copolymer prepared by the process described in Example I were slurried into a mixture of 43 parts of 96% $H_2SO_4$ and 68 parts methyl alcohol contained in a 500 ml. flask equipped with stirrer, thermometer, reflux condenser, and drying tube. The contents of the flask were heated to the reflux temperature of 80° C. for 6 hours. The batch was then allowed to cool, after which the beads were washed with dry methyl alcohol. A mixture of 30 parts methyl alcohol and ethylene diamine were added to the beads, and the batch was refluxed for 7 hours. The batch was then cooled, and the beads were washed with methanol and water, and then further backwashed. The anion exchange resin had an anion exchange capacity of 4.8 meq./gm. dry resin in the chloride form.

*Example IV*

50 parts of copolymer prepared as described in Example I were slurried into 102 parts dry methyl alcohol contained in a 500 ml. flask equipped with stirrer, thermometer, reflux condenser and drying tube. The mixture was stirred and cooled to 5° C. To this slurry was added, over the course of three hours, 135 parts sulfuryl chloride, technical grade. After addition of the sulfuryl chloride was complete, the batch was stirred for four hours at 5° C. and for 16 hours at 25° C. The beads were then washed with dry methyl alcohol, and then treated with a mixture of 30 parts methyl alcohol and 120 parts ethylene diamine for seven hours at 80° C. The washed and backwashed resin had an anion exchange capacity of 5.0 meq./gm. dry resin in the chloride form.

*Example V*

Into three-liter four-necked flask equipped with a thermometer, stirrer, thermoregulator mechanism, and reflux condenser was charged a solution of 30 parts salt, 6 parts of a commercial dispersing agent and 0.6 part of gelatin in 1000 parts water. To this was added a mixture of 37 parts trivinylbenzene, 420 parts cyanoethyl methacrylate, and 4 parts benzoyl peroxide. The stirred mixture, containing droplets of the polymerizable material was heated to 70° C. and held at this temperature for four hours, after which it was heated for one hour at 90° C. The batch was cooled, and the clear beads were filtered, washed, and dried for five hours at 125° C.

Fifty parts of the copolymer beads were treated according to the procedure described in Example III. An anion exchange resin with a capacity of 3.2 meq./gm. dry resin in the chloride form was obtained.

*Example VI*

Fifty parts of the copolymer obtained from the process described in Example I were heated with 210 parts aminoethylethanolamine at a temperature of 180° C. for nine hours, after which time ammonia evolution had ceased. The batch was cooled, washed with methyl alcohol, with water, and then backwashed. A resin was obtained with an anion exchange capacity of 2.7 meq./gm. dry resin in the chloride form.

*Example VII*

Fifty parts of the copolymer obtained by the process described in Example V was treated with 264 parts neopentyldiamine at a temperature of 110° C. for 22 hours. After washing and backwashing, the resin obtained had an anion exchange capacity of 3.0 meq./gm. dry resin in the chloride form.

*Example VIII*

The process for making copolymer pearls described in Example I was modified to include the addition of 102 parts tert-amyl alcohol to the monomer mixture. The copolymerization reaction was carried out just as described in Example I. The added alcohol was removed from the copolymer by steam distillation and the copolymer pearls were dried for 24 hours at 85° C. Hard, white, opaque beads, typical of materials with a macroreticular structure, were obtained.

Fifty parts of copolymer beads were treated with dry HCl gas in methyl alcohol as described in Example II. To the treated beads was then added 45 parts methyl alcohol and 150 parts trimethylenediamine. The mixture was refluxed for six hours, and the beads were washed with methyl alcohol and water. After washing and backwashing, the resin had an ion exchange capacity of 4.2 meq./gm. dry resin.

We claim:
1. An insoluble anion exchange resin containing heterocyclic rings obtained by reacting
   (A) a cross-linked copolymer formed by copolymerization of a nitrile-containing vinyl monomer and from 0.5% to 30% by weight of a polyvinyl monomer, which weight is based on the total weight of the polymerizable vinyl monomers, and
   (B) a diamino compound selected from the group consisting of

$$R^1NHCR^2R^3CR^4R^5NH_2$$
   and
   $$R^1NHCR^2R^3CR^4R^5CR^6R^7NH_2$$

in which $R^1$, $R^2$, $R^3$, $R^4$, $R^5$, $R^6$ and $R^7$ are selected from the group consisting of hydrogen and lower alkyl radicals, the reaction being carried out with a minimum of one mole of amine per mole of cyano group in the polymer, the temperature of the reaction being at least about 105° C. when the method employed is simply to heat the copolymer and the amine until evolution of ammonia has substantially ceased, and being in the range of about 60° C. to 105° C. when the method employed is to first convert the cyano groups of the copolymer to imidate ester salt groups, by reaction under anhydrous conditions with strong mineral acid and an alcohol, and then react the imidate ester salt groups with the amine.

2. An anion exchange resin prepared as set forth in claim 1 in which the cross-linked copolymer possesses a macroreticular structure.

3. An anion exchanger prepared as set forth in claim 1 in which the reaction is conducted in the presence of an inert solvent.

4. An anion exchange resin prepared as set forth in claim 3 in which the inert solvent is an excess of the diamino compound.

5. An insoluble anion exchange resin containing heterocyclic rings obtained by reacting:
   (A) a cross-linked copolymer prepared from a monoethylenically unsaturated monomer which contains a cyano group selected from the group consisting of acrylonitrile, methacrylonitrile, vinylidene cyanide, 1-cyanomethyl, 1-cyanoethyl, 1-cyanopropyl, 2-cyanopropyl, 1-cyanobutyl, 2-cyanobutyl,3-cyanoethyl, 1-cyanopropyl, 2-cyanopropyl, 1-cyanobutyl, 2-cyanobutyl, 3-cyanobutyl acrylates and methacrylates; the corresponding N-cyanoalkyl acrylamides and methacrylamides; α-ortho-, meta-, and para-cyanostyrene; 1-cyanobutadiene and 2-cyanobutadiene; the methyl, ethyl, propyl, and butyl esters of α-cyanoacrylic acid; and the N-cyanoalkyl esters of α-cyanoacrylic acid, and a polyethylenically unsaturated compound selected from the group consisting of metadivinylbenzene, paradivinylbenzene, mixtures of these isomers, 1,3,5-trivinylbenzene, 1,2,4-trivinylbenzene, trivinoxypropane, the isomeric divinyl xylenes, divinyl toluenes, and divinylnaphthalenes, N,N'-methylene bisacrylamide, N,N'-methylene bismethacrylamide, and N,N'-divinylethylene urea with (B) a diamino compound selected from the group consisting of

and

in which $R^1$, $R^2$, $R^3$, $R^4$, $R^5$, $R^6$ and $R^7$ are selected from the group consisting of hydrogen and lower alkyl radicals, the reaction being carried out with a minimum of one mole of amine per mole of cyano group in the polymer, the temperature of the reaction being at least about 105° C. when the method employed is simply to heat the copolymer and the amine until evolution of ammonia has substantially ceased, and being in the range of about 60° C. to 105° C. when the method employed is to first convert the cyano groups of the copolymer to imidate ester salt groups, by reaction under anhydrous conditions with strong mineral acid and an alcohol, and then react the imidate ester salt groups with the amine.

6. An anion exchange resin prepared as set forth in claim 5 in which the cross-linked copolymer possesses a macroreticular structure.

7. An anion exchange resin prepared as set forth in claim 6 in which the monoethylenically unsaturated monomer is acrylonitrile.

8. An anion exchange resin prepared as set forth in claim 6 in which the monoethylenically unsaturated monomer is 1-cyanoethyl acrylate.

9. An anion exchange resin prepared as set forth in claim 6 in which the monoethylenically unsaturated monomer is 1-cyanomethyl methacrylate.

10. An anion exchanger as set forth in claim 6 in which the polyethylenically unsaturated compound is divinylbenzene.

11. An anion exchanger as set forth in claim 6 in which the polyethylenically unsaturated compound is trivinylbenzene.

References Cited by the Examiner

UNITED STATES PATENTS

| 3,022,253 | 2/1962 | McMaster | 260—2.1 |
| 3,037,052 | 5/1962 | Bortnick | 260—2.2 |

FOREIGN PATENTS 14,042  8/1961  Japan.

WILLIAM H. SHORT, *Primary Examiner.*

LOUISE P. QUAST, *Examiner.*

C. A. WENDEL, *Assistant Examiner.*